(12) United States Patent
Proidl et al.

(10) Patent No.: US 9,445,152 B2
(45) Date of Patent: Sep. 13, 2016

(54) RECOMMENDER SYSTEM WITH CONSISTENT PROFILE APPLICATION

(75) Inventors: Adolph Proidl, Vienna (AT); Thomas Dvorak, London (GB)

(73) Assignee: Funke Digital TV Guide GmbH, Berlin (DE)

( * ) Notice: Subject to any disclaimer, the term of this patent is extended or adjusted under 35 U.S.C. 154(b) by 113 days.

(21) Appl. No.: 13/807,430

(22) PCT Filed: Aug. 26, 2011

(86) PCT No.: PCT/EP2011/064756
§ 371 (c)(1),
(2), (4) Date: Dec. 28, 2012

(87) PCT Pub. No.: WO2012/025625
PCT Pub. Date: Mar. 1, 2012

(65) Prior Publication Data
US 2013/0104168 A1    Apr. 25, 2013

(30) Foreign Application Priority Data
Aug. 27, 2010    (EP) ..................... 10174344

(51) Int. Cl.
*H04N 21/458*    (2011.01)
*G06F 17/30*    (2006.01)

(52) U.S. Cl.
CPC ........ *H04N 21/458* (2013.01); *G06F 17/3092* (2013.01); *G06F 17/30569* (2013.01)

(58) Field of Classification Search
CPC ............. G06F 17/2247; G06F 17/227; G06F 17/30569; G06F 17/3092; H04N 21/458
See application file for complete search history.

(56) References Cited

U.S. PATENT DOCUMENTS

| | | | |
|---|---|---|---|
| 6,721,286 B1* | 4/2004 | Williams | ................ H04L 69/28 370/282 |
| 7,415,025 B1* | 8/2008 | Venkataraman et al. | .. 370/395.2 |
| 8,010,518 B2* | 8/2011 | Petri | ............................. 707/705 |

(Continued)

FOREIGN PATENT DOCUMENTS

| | | |
|---|---|---|
| CN | 1706169 | 12/2005 |
| CN | 1728126 | 2/2006 |
| CN | 101201816 | 6/2008 |
| RU | 2004133363 | 4/2006 |
| WO | 0169428 | 9/2001 |

OTHER PUBLICATIONS

WonSuk Lee, et al; "Use Cases and Requirements for Ontology and API for Media Resource 1.0"; Jan. 21, 2010; XP002620758; whole document.

(Continued)

*Primary Examiner* — Pinkal R Chokshi
(74) *Attorney, Agent, or Firm* — Ware, Fressola, Maguire & Barber LLP (57) ABSTRACT

The present invention relates to an apparatus, a method and a computer program product for controlling distribution and processing of content-related metadata of different content sources (101-1 to 101-*n*), wherein extracted metadata are transformed at from a received format of the extracted metadata into a predetermined common format used by a recommender engine. Additionally or alternatively, it is checked for an overlap between a detected classification parameter and at least one stored classification parameter, and non-overlapping metadata is enriched by adding at least one new classification parameter derived from an ontology-based processing of the non-overlapping metadata.

10 Claims, 3 Drawing Sheets

(56) References Cited

U.S. PATENT DOCUMENTS

| | | | |
|---|---|---|---|
| 2005/0005261 A1* | 1/2005 | Severin | 717/108 |
| 2005/0210070 A1* | 9/2005 | Macneil | 707/104.1 |
| 2006/0036640 A1 | 2/2006 | Tateno et al. | |
| 2007/0083899 A1* | 4/2007 | Compton et al. | 725/87 |
| 2007/0168335 A1* | 7/2007 | Moore et al. | 707/3 |
| 2008/0168070 A1 | 7/2008 | Naphade et al. | |
| 2008/0222201 A1* | 9/2008 | Chen et al. | 707/104.1 |
| 2009/0019458 A1 | 1/2009 | Katari et al. | |
| 2010/0242073 A1* | 9/2010 | Gordon et al. | 725/98 |
| 2011/0072270 A1* | 3/2011 | Little et al. | 713/175 |
| 2013/0289862 A1* | 10/2013 | Chapman et al. | 701/118 |

OTHER PUBLICATIONS

Yannick Naudet, et al; "An Ontology-Based Profiling and Recommending system for Mobile TV"; Semantic Media Aaptation and Personalization, 2008; Third International Workshop IEEE; Dec. 15, 2008; XP031379305; whole document.

J. Jovanovic, et al; "Bridging Knowledge Bases' Heterogeneity using XML/XSLT Approach"; E-Technology, E-Commerce and E-Service 2005; Proceedings IEEE International Conference, Hong Kong, China; Mar. 29, 2005; XP010783683; pp. 490-493; whole document.

* cited by examiner

RECOMMENDER SYSTEM WITH CONSISTENT PROFILE APPLICATION

CROSS REFERENCE TO RELATED APPLICATIONS

This application is the U.S. National Stage of International Application Number PCT/EP2011/064756 filed on Aug. 26, 2011 which was published in English on Mar. 1, 2012 under International Publication Number WO 2012/025625 which in turn claims priority under 35 USC §119 to European Patent Application No. 10174344.1 filed on Aug. 27, 2010, which applications are hereby incorporated by reference.

FIELD OF THE INVENTION

The present invention relates to an apparatus, a method, and a computer program product for controlling a recommender system for at least one content item.

BACKGROUND OF THE INVENTION

Hard-disk drives and digital video compression technologies have created a possibility of time-shifting live television (TV) and recording a large number of TV shows in high quality without having to worry about the availability of tapes or other removable storage media. At the same time, digitalization of audiovisual signals has multiplied the number of content sources for an average user. Huge amounts of video clips are published daily on the Internet across various services, and all major content producers are already making their entire content libraries available online. As a consequence, thousands of potentially increasing programs are made available every day and can be recorded and stored locally for later access. Hence, digitalization of audiovisual materials together with the broad availability of high speed data transfer resulted in an ever increasing amount of content that any consumer has available for consumption at any point in time. Large repositories of audiovisual assets or content items are available on the internet and are competing with digital, live TV channels and video on demand (VoD) libraries, offered by TV service providers. In general, the term "content item" is used here in a sense that it represents an item of information within a content area.

However, in view of this enormous amount of offered content items, individual content selection becomes an important issue. Information that does not fit to a user profile should be filtered out and the right content item that matches a user's needs and preferences (e.g. user profile) should be selected.

Recommender systems address these problems by estimating a degree of likeliness of a certain content item for a certain user profile and automatically ranking the content item. This can be done by comparing a content item's characteristics (e.g. features, metadata, etc.) with a user profile or with similar profiles of other users. Thus, recommender systems can be seen as tools for filtering out unwanted content and bringing interesting content to the attention of the user.

The use of recommender technology is steadily being introduced into the market. Among various examples, websites offer a recommender to support users in finding content items (e.g. movies) they like, and electronics devices (e.g. personal video recorders) use recommender for automatic filtering content items. Recommender systems are increasingly being applied to individualize or personalize services and products by learning a user profile, wherein machine learning techniques can be used to infer the ratings of new content items.

Commonly used recommender techniques are collaborative filtering and naïve Bayesian classification. Thereby, from a vast amount of content items, only those items that match a profile of a user or group of users (i.e. user profile) can be retrieved. Recommenders are typically offered as stand-alone services or units, or as add-ons (e.g. plug-ins) to existing services or units. They increasingly appear in consumer devices, such as TV sets or video recorders, or services used by those devices. Recommenders typically require user feedback to learn a user's preferences. Implicit learning frees the user from having to explicitly rate items, and may by derived by observing user actions such as purchases, downloads, selections of items for play back or deletion, etc. Detected user actions can be interpreted by the recommender and translated into a rating. For example, a recommender may interpret a purchase action as positive rating, or, in case of video items, a total viewing duration of more/less than 50% may imply a positive/negative rating. Typically, a user profile is built by gathering or deriving information from users about what they need and is refined by using the user's preference about the chosen content items.

As the consumers time to select and enjoy the available content assets doesn't increase, the importance of proper guidance towards the most interesting and appropriate audiovisual content gains in importance. Typically internet sites, service providers, and device manufacturers offer isolated solutions to provide proper guidance through their particular offering, e.g. when a particular video is watched, the user is prompted for other videos he/she might like to watch, after the playback of the item has finished. However, there will be no cross-domain suggestions for what he/she might want to watch on other channels, such as live TV for example.

Existing approaches to allow to search across isolated solutions today are based on two elements:

1. Merging of user profiles (here, e.g., two sites agree to share the information gathered about the user in order to improve the targeting capabilities at both sides, taking advantage of the additionally gained insights).

2. Cross domain recommendation (here one user profile is translated into another domain, e.g. the profile derived from the purchasing history of an internet shop is translated into a profile that can be used by a recommender operated as part of a VoD service).

User profiles built up in separated domains or silos show weak cross silo recommendation performance. An EPG (electronic program guide) site that features excellent recommendations for live TV programming will therefore be unable to show the same recommendation performance for assets of a VoD library. This again drives separation, as the owners of the EPG site will not put up VoD recommendations, because bad recommendations, although only for VoD assets, result in an overall decrease in the perception of the quality of the site.

SUMMARY OF THE INVENTION

It is an object of the present invention to provide an enhanced recommender system with improved cross-domain recommendation performance.

This object is achieved by a method as claimed in claim 1 or claim 6, an apparatus as claimed in claim 8 or claim 9, and a computer program product as claimed in claim 10.

Metadata shall mean any information added or associated to a particular content item to be rated, i.e. "data about data", of any sort in any media. An item of metadata may describe an individual content item, or a collection of data including multiple content items and/or hierarchical levels, for example a database scheme. Additionally, the metadata may be definitional data that provides information about or documentation of a content item or a group of content items. For example, metadata may document data about data elements or attributes (name, size, data type, genre, mood, casting, etc) of a content item or group of content items, and data about records or data structures (length, fields, columns, etc) of a content item or group of content items, and data about data (where it is located, how it is associated, ownership, etc.) of a content item or group of content items. Metadata may also include descriptive information about the context, quality and condition, or characteristics of the content item or group of content items.

Accordingly, the proposed transformation and/or enrichment of metadata can make sure that the obtained user profile is applicable for recommendations independent of the asset domain. The content metadata is specially prepared for all domains of different content sources, assuring correctness and consistency across different domains. Moreover, user experience derived from implicit and/or explicit feedback means can be kept consistent across domains. More specifically, the availability of consistent content metadata makes sure that one identical profile is instantly applicable to all domains to provide recommendations of highest quality. The consistency in recommendation quality and user experience in interface and interaction possibilities across different domains allows direct applicability of a recommender engine for various domains.

According to a first aspect, the format of the received metadata may be an extended markup language format for example. In this case, an extensible stylesheet language transformation may be used for the transformation processing. More specifically, a dedicated extensible stylesheet language transformation document that describes how to automatically transform metadata of the received format into metadata of the predetermined common format could be created for each domain or format. Of course, other (document) formats for storing, conveying or forwarding content-related metadata could be used. The transformation processing and optional transformation documents then have to be selected based on the used (document) format of the metadata.

According to a second aspect which can be combined with the first aspect, it could be checked whether the received format of the received metadata is a known format. Then, the received metadata could be discarded and corresponding information could be sent to a source of the received format, if the received format is an unknown format. Thereby, the corresponding content source could be prompted to use a different format for its metadata.

According to a third aspect which could be combined with any of the first and second aspects, a new content item may be received and it may be checked based on received metadata related to the received content item whether the new content item belongs to a dedicated scope of a recommendation group of the recommender engine. Then, if the received new content item does not belong to any dedicated scope, the received new content item may be used to establish a new scope or adding the received new content item to an existing scope.

According to a fourth aspect which could be combined with any of the first to third aspects, the enrichment of the metadata may comprise searching for at least one classifying term in a textual information (e.g. title information or the like) of the extracted metadata and deriving the new classification parameter by generalizing the at least one classifying term.

It is noted that the above control or recommender apparatus can be implemented as discrete hardware circuitry with discrete hardware components, as an integrated chip, as an arrangement of chip modules, or as a signal processing device or computer device or chip controlled by a software routine or program stored in a memory.

BRIEF DESCRIPTION OF THE DRAWINGS

The invention will now be described, by way of example, based on embodiments with reference to the accompanying drawings, wherein.

DESCRIPTION OF EMBODIMENTS

Embodiments of the present invention will now be described based on an exemplary recommender system which generates ratings on content items, such as books, TV programs, movies, etc.

Figure 1:
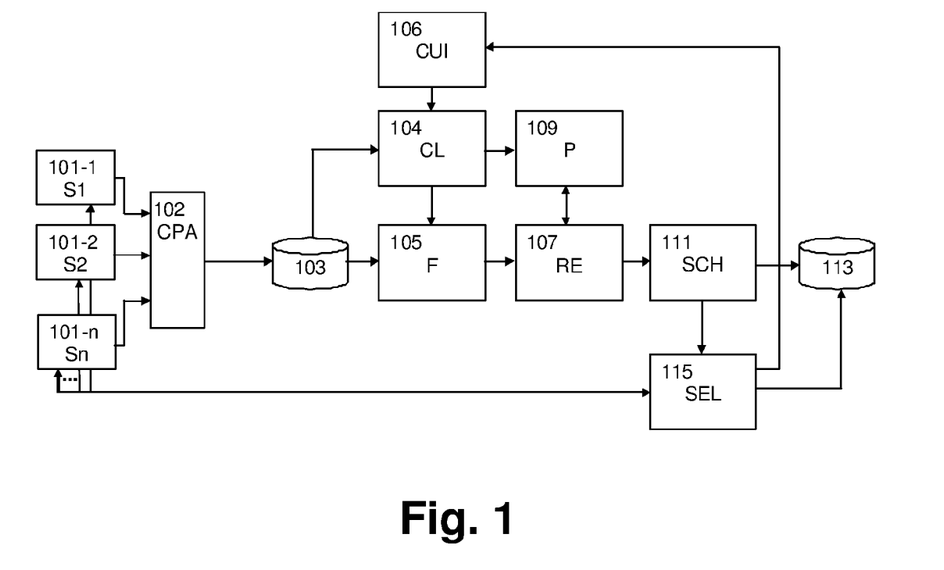
FIG. 1 shows a schematic block diagram of a recommender system according to an embodiment of the present invention.

FIG. 1 shows a schematic block diagram of a recommender apparatus or system which comprises a metadata base 103 adapted to receive content-related metadata from a plurality of different content sources (S1 to Sn) 101-1 to 101-n of different domains, such as an EPG service for live TV, which provides metadata on TV programs, a video on demand (VoD) catalogue source, top internet sources (e.g. video podcasts) etc., via a consistency processing apparatus or server functionality (CPA) 102 for creating consistency and reliability at an intermediate location where the content-related metadata of the different content sources 101-1 to 101-n are received and transformed to achieve or create consistency and reliability across the different domains. The metadata base 103 can be connected to at least one pre-selection filter (F) 105 which is associated with a personalized content channel and which filters content items accordingly. It is noted that any number of personalized content channels could be provided. The output of the pre-selection filter 105 is connected to a respective recommender engine (RE) 107. Thus, each personalized content channel may have an own recommender engine 107 associated therewith. Each recommender engine 107 and hence personalized content channel has a profile (P) 109 associated therewith. The output of the recommender engine 107 is connected to a scheduler (SCH) 111. The scheduler 111 is connected to a storage device 113 (e.g. a set of hard-disk drives), and to a selector (SEL) 115.

In the embodiment, the consistency processing apparatus 102 may be adapted to actively retrieve metadata from different ones of the content sources 101-1 to 101-n. This could be achieved, for example, by storing address or contact information (e.g. server addresses) of at least some of the content sources 101-1 to 101-n at the consistency processing apparatus 102 or deriving the address or contact information from a remote source or database, and by using this address or contact information to access respective ones of the content sources 101-1 to 101-n.

In addition to the content-related metadata, the content sources 101-1 to 101-n provide for example at least audio/video information in a broadcasting or on-demand fashion, while this includes indirect provisioning by means of Internet addresses (e.g. URIs (Uniform Resource Identifiers)). The content-related metadata could be for example EPG information inside a vertical blanking interval of a video signal, or MPEG-7 metadata on segments of a particular content item (e.g. the scene boundaries of a movie), or an RSS feed describing different episodes of a video blog or podcast. RSS (most commonly expanded as "Really Simple Syndication") is a family of web feed formats used to publish frequently updated works—such as blog entries, news headlines, audio, and video—in a standardized format. An RSS document (which is called a "feed", "web feed", or "channel") includes full or summarized text, plus metadata such as publishing dates and authorship. The different content sources 101-1 to 101-n can be connected to a selector 115 comprising at least one set of content isolation means (e.g. a tuner or the like) which allows to isolate one or more content items for recording on the storage device 113. The output of the selector 115 is connected to the storage device 113.

The metadata of assets that are part of the available services of the content sources 101-1 to 101-n are captured, enriched, and aligned at the consistency processing apparatus 102 to form a rich and consistent metadata base 103 which may also be located remote from the recommender engine 107. The resulting set of consistent metadata is then made available to frontend solutions, e.g. a web site or devices with an on-screen-display output for a television set, which incorporate or use a recommender system. The recommender system can then seamlessly be applied across all known assets or domains, e.g. a recommender that has been trained in the context of the EPG can instantly provide perfect recommendations for VoD assets.

The consistent user interface (CUI) 106, which may also receive selection-related information from the selector 115, reports all relevant information on user interactions to the classifier (CL) 104, which retrieves the metadata that relates to those interactions from the metadata base 103. The classifier (CL) 104 translates implicitly observed user actions and explicit user input into two settings: 1) the profile 109, which is used by the recommender (RE) 107 to compute at least one score for a content item; and 2) the filter (F) 105 setting, which performs a pre-selection of potentially interesting content items out of all content items available in the metadata base 103.

The operation of the apparatus of FIG. 1 will now be described. Metadata of a current content item to be played out on a personalized content channel is gathered from the respective content source (e.g. Internet service) or obtained via other means, e.g., via transmission in the vertical blanking interval of an analog TV broadcast signal or via digital video broadcast (DVB) transport streams, or combinations of any of the above, and transformed at the intermediate location, which may be at the input of the recommender system or apparatus or at a remote location. The content item may be a TV program, data stream containing video and/or audio data or a segment of a program etc.

The metadata may comprise a plurality of attributes and attribute values associated with the content item such as title, actors, director and genre. Each profile 109 is based on the metadata together with data indicating the "like" or "dislike" of the user. The rating of a "like" and "dislike" can be based on feedback or content items that pass the associated pre-selection filter 105. This feedback can be given e.g. via the consistent user interface 106 as explicit rating by the users that use the particular personalized content channel. The ratings can be made in several ways. For example, the user can, using a remote control device, indicate for a currently selected content item or a given attribute of the current content item his rating ("like" or "dislike") by pressing appropriate buttons on a user interface (e.g. the remote control device) whilst bearing the current content item. Alternatively, the behaviour of the user can be observed. For example, if the user watches a current content item for more than a predefined time interval (for example, 20 minutes), this could automatically indicate "like". In a more advanced setting interface screen, an explicit "like" degree on a discrete or continuous scale can be provided for at least one of the attributes and attribute values associated with the content item, instead of just a binary "like" or "dislike" classification. E.g. the like degree for the attribute movie actor with the value "Clint Eastwood" can be set to five stars.

When information data of a content item passes the filter 105, this information data is forwarded to the recommender engine 107. The recommender engine 107 calculates a "like" degree or rating, based on its associated profile 109, for this subsequent content item. The information data associated to the subsequent content item is then forwarded, along with the computed rating, to the scheduler 111, which subsequently computes recording schedule that will be used to schedule the recording of content items offered by the recommender engine 107 onto the storage device 113. In particular, the scheduler 111 may primarily consider the content items of high like degree or rating while still considering sufficient new content for each personalized content channel. To this end, the recording schedule computed by the scheduler 111 is used to instruct the scheduler 115 to select the content items available from the related one of the content sources 101-1 to 101-n to record them on the storage device 113.

Use or user profiles can be derived using three basic methods: implicit profiling; explicit profiling; and feedback profiling. Implicit profiling methods derive content use profiles unobtrusively from the user's use histories, e.g., sets of TV shows watched and not watched. Explicit profiling methods derive content use profiles from user's answered questions as that include explicit questions about user preferences, e.g. a strong preference for the actor "Clint Eastwood". Feedback profiling methods derive use profiles from content items for which a user has provided ratings of the degree of like or dislike.

A first example of the consistent user interface 106 can be a personal program guide for live programming e.g. on a display screen. Next to live broadcasting channels personal views can be created on the available live TV programming by simply selecting one of those live TV programs as a seed program and then assigning this new viewing option a specific label. Further all programs that appear in the view of the screen can be rated to refine the personalized view, characterized by its filter settings and profile. It is noted that the program guide can be adapted to seamlessly list programming from live TV and VoD services.

A second example of the consistent user interface 106 can be a personal program guide for on demand content items e.g. on a display screen. In this example the application of profiles that were created within the scope of personal EPG viewing options provide an instant overview of available VoD content items that match the preferences of the viewer per scope of interest. The user can typically return to that screen, because it is an effective and extremely convenient way to browse a huge content library. At the same time part of the screen real-estate can be used to promote content items that need to be sold off (e.g. last chance), or that provide a premium margin when sold (e.g. just arrived). It is noted that the usage paradigm is identical to the above personal program guide for live TV. Also here the user can select any content item presented on the screen and use it as the seed event to create a new personal viewing option, which will subsequently be available in the VoD, but also the EPG view.

A third example of the consistent user interface 106 can be personal program guide for recorded, live, and on demand content items. In case of a provision of personal video recording capabilities, an aggregated content view can be realized. It may show recorded content items, live TV programming, targeted offers, branded channels, and assets from VoD libraries, all grouped by the viewing options the user had developed.

As a conclusion, the embodiment allows for a step by step deployment of advanced content services and packages without compromising trust or usability, which maximizes uptake and optimizes targeting performance from context based learning.

Figure 2:
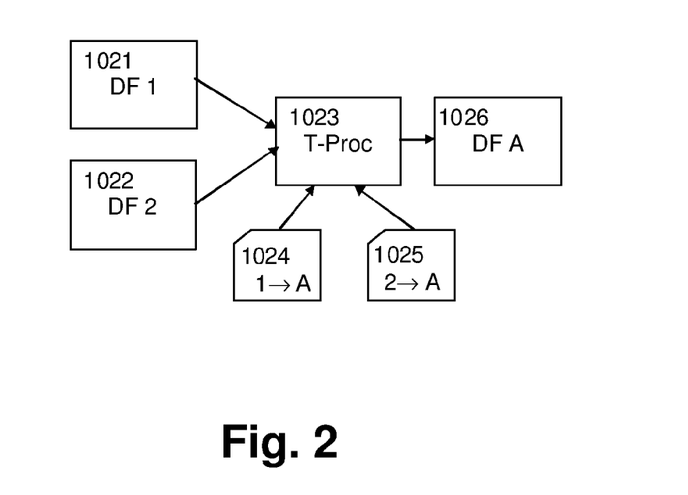
FIG. 2 shows a schematic diagram of a transformation processing unit or functionality according to an embodiment of the present invention.

FIG. 2 shows a schematic block diagram of an implementation example of the consistency processing apparatus 102. A transformation processor 1023 is adapted to transform different document formats (DF1) 1021 and (DF2) 1022 used by the different content sources 101-1 to 101-*n* into a common document format (DF A) 1026 used by the recommender engine 107. The transformation processing may be based on dedicated format conversion documents 1024, 1025 which could be stored at the consistency processing apparatus 102. The components or blocks shown in FIG. 2 may be implemented as hardware circuits or components or, alternatively, as software routines stored in a memory of a computer or processor device.

As a specific but non-limiting example, the metadata of different domains can be transformed to the common format 1026 by using XSLT (Extensible Stylesheet Language Transformation). This exemplary method can be applied in case the metadata for the different domains is provided as XML documents, and the consistent metadata format is also expressed in XML. For each domain a dedicated XSLT document 1024, 1025 is created that describes how to automatically transform metadata from, e.g. domain 1 and 2 as in the above example, into the desired target format, here called A.

In the case that non XML formats are used, a dedicated transformation software block (natively implementing the combination of the above depicted XSLT Processor and the XSLT x→A format conversion document) could be build to perform the transformation.

Figure 3:
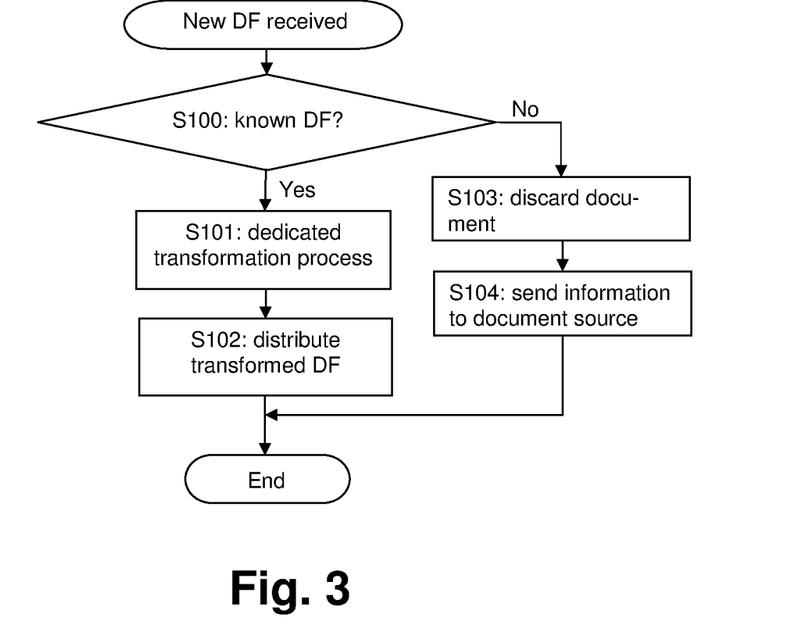
FIG. 3 shows a flow diagram of a processing for achieving a common format of distributed metadata according to an embodiment of the present invention.

FIG. 3 shows a flow diagram of a processing of the transformation processor 1023 for achieving a common format of distributed metadata according to an embodiment.

The process is initiated when a new metadata is received at or supplied to the consistency processing apparatus 102. In step S100 it is first checked whether the document format of the received metadata is a known format. E.g., a related transformation document or software block is provided at the transformation processor 1023. For a document with known document format, the dedicated transformation process is applied in step S101 and the transformed metadata document is distributed in step S102. For documents with unknown document format (e.g. that fail to translate properly or that miss vital information), the procedure branches to step S103 and all such documents (e.g. metadata with descriptions of audiovisual content items that don't contain the minimally required information) are discarded. As a result it will not be possible to find or recommend those content items.

If a failed document is discarded in step S103, information about the unknown, missing or erroneous format is send to the respective document source (i.e. one of the content sources 101-1 to 101-*n*) and the owner or source of the description (e.g. the studio that produced and published the movie) is informed about the missing information and is prompted to provide such information in order to make his content item discoverable in the system.

It can be mentioned that in an alternative embodiment the operator of the transformation processor 1023, and not the content source will be informed about documents with unknown document format, or yet unspecified values inside a known format, allowing the operator to directly create new format conversion documents to correct the transformation error.

Figure 4:
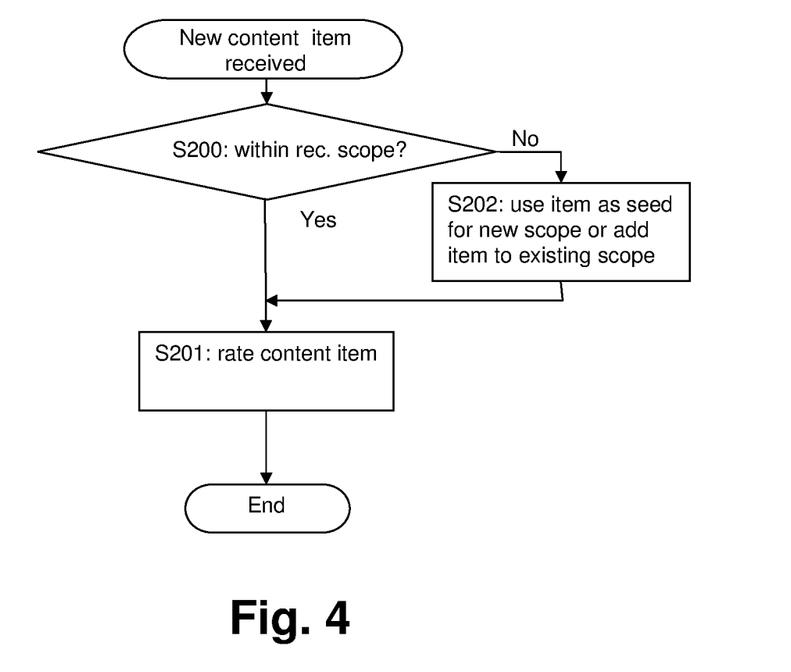
FIG. 4 shows a flow diagram of a processing for allocating a content item to a recommendation scope according to an embodiment of the present invention.

FIG. 4 shows a flow diagram of a processing for allocating a content item to a recommendation scope according to an embodiment.

The procedure of FIG. 4 may be implemented at recommender engine 107 to achieve a consistent user experience (e.g. feedback, recommender input, way recommendation items, recommender output) across different domains.

The presentation of recommendations is always performed in groups. Each group corresponds to a dedicated programming scope (e.g. linked to a particular program type and genre, e.g. program type=movie and genre=action), further referred to as recommendation scope. Programs that belong to such a recommendation scope can be readily identified (e.g. at the filter 105) by means of SQL (Structured Query Language) queries or other filtering techniques on datasets. Independent of the domain for which recommended content items are displayed the procedure of FIG. 4 can be applied to received content items.

If a new content item is received or processed, it is first checked in step S200, whether the content item resides within a recommendation scope. If so, a score is computed for the content item in step S201, indicating the assumed like degree of such content item. Optionally, the content item may be used as seed for a new recommendation scope (with the option of moving all similar content items with it from the current to the new programming scope), or the content item may be added to another recommendation scope (with the option of moving all similar content items with it from the current to the new programming scope). On the other hand, if it is determined in step S200 that the content item doesn't reside within a provided recommendation scope (e.g. has been found as part of a search, or a programming guide), the procedure branches to step S202 and the content item is optionally used as seed for a new recommendation scope or added to an existing recommendation scope, if possible.

It is noted note that recommendation scopes are shared between domains, i.e. if a new recommendation scope is created in the domain of TV, by, e.g., seeding that new scope with a movie, that recommendation scope will now instantly exist also in, e.g., the VoD domain, recommending instantly similar or related movies.

In the following, a technical measure is described for capturing, enriching and aligning metadata of content items to achieve a consistent set of metadata.

Figure 5:
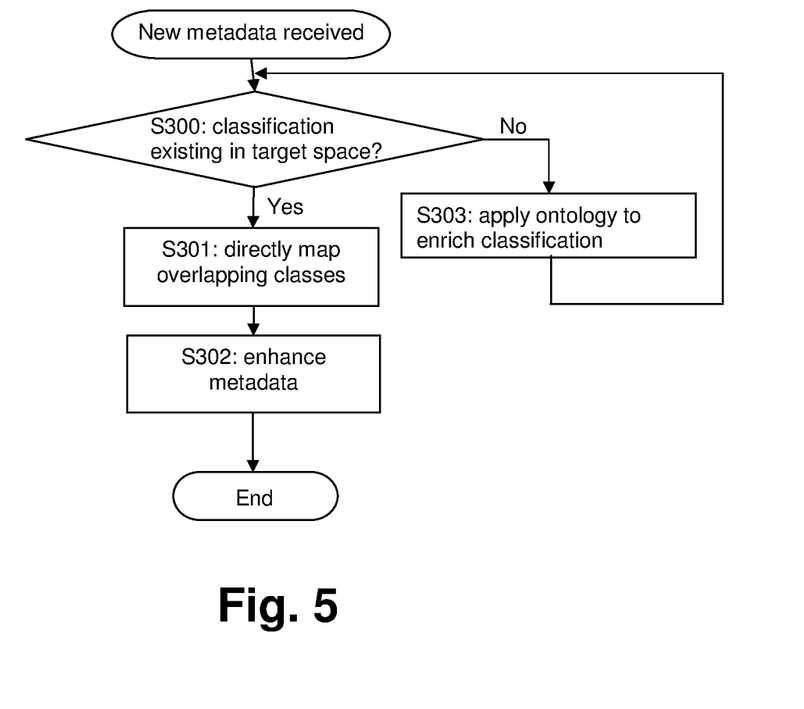
FIG. 5 shows a flow diagram of a processing for enrichment of received metadata according to an embodiment of the present invention.

FIG. 5 shows a flow diagram of a processing for enrichment of received metadata according to an embodiment, which may be implemented at the consistency processing apparatus 102 or the classifier 104.

Capturing of metadata for assets can be manifold, e.g. the metadata can be extracted from a digital video broadcasting service information (DVB-SI) of a live TV broadcasting signal or can be provided together with provisioned VoD assets, e.g. as CableLabs ADI 1.1 file, or can be extracted from the file that contains the audiovisual asset, e.g. metadata is embedded as ID3 tag, or can be provided independently by a publisher, e.g. in TVanytime format.

The alignment of such data, coming from different sources (i.e. not necessarily also in a different format) is performed by ensuring a proper mapping between value spaces (such a mapping description may be inherent part of the steps described in FIG. 3). Examples of such a value space could be program type, where a source format might classify content items as, at least one of show, or series, or news, or movie, or other, and the consistent target format might make use of the values sport, or, entertainment, or, series, or news, or movie—in this example the overlapping types (series/news/movie) are directly mapped to one another, while show is mapped to entertainment, and content items marked as other are forwarded for further automatic or manual processing.

When new metadata is received or processed, for each classification value in the source format it is first checked in step S300 whether a corresponding class exists in the target classification space. If so, the overlapping classes are mapped in step S301 and the metadata is enhanced in step S302, as described below. If no overlap is determined in step S300, the procedure branches to step S303 and an ontology processing is applied to enrich the classification type.

The enrichment of the metadata is thus done automatically, e.g. through the application of ontologies. To continue the above example, the ontology might allow to reason that "formula 1", "soccer", "basketball", etc. are all sports. Therefore one automatic mapping or enrichment rule for content items classified as other in the source format can be based on a detected title information. If the program or content title starts with one of the words that allow to classify it as "sports", the program type is automatically adjusted to the more general class "sport". Further the ontology might specify that "worldcup" is a sports event, and therefore if "worldcup" is found in the long textual description of an asset that is classified as "sport", but whose keyword section and theme circle doesn't classify it as a worldcup event, this additional information will be automatically added to the metadata of the asset.

It is noted that the present invention can be applied to any recommender system for set-top boxes, TV sets, mobile phones, personal digital assistants (PDAs), personal computers (PCs) and all devices where recommenders are used to collect, filter, and present content items from multiple sources to their users. The invention is thus not restricted to recommenders of television or film content, but can be applied to music, theatre shows, books and all types of products and services for which recommenders can be built.

In summary, the present invention relates to an apparatus, a method and a computer program product for controlling distribution and processing of content-related metadata of different content sources (101-1 to 101-n), wherein extracted metadata are transformed from a received format of the extracted metadata into a predetermined common format used by a recommender engine. Additionally or alternatively, it is checked for an overlap between a detected classification parameter and at least one stored classification parameter, and non-overlapping metadata is enriched by adding at least one new classification parameter derived from an ontology-based processing of the non-overlapping metadata.

While the invention has been illustrated and described in detail in the drawings and the foregoing description, such illustration and description are to be considered illustrative or exemplary and not restrictive. The invention is not limited to the disclosed embodiments. From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfill at least the functions of FIGS. 2 to 5 based on corresponding software routines. The computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

The invention claimed is:

1. A method of controlling distribution of content-related metadata from different content-related sources, said method comprising:
   a) receiving said metadata at an intermediate location between said content-related sources and a recommender engine, wherein said metadata is metadata of a content item to be played out on a personalized content channel;
   b) processing the received metadata at said intermediate location to transform a received format of said received metadata into a predetermined common format used by said recommender engine, wherein the recommender engine is associated with the personalized content channel;
   c) forwarding the processed metadata to a metadata base, wherein the metadata base is connected to the recommender engine via a pre-selection filter for filtering content items; and
   d) checking whether said received format of said received metadata is a known format, and if said received format is an unknown format, discarding said received metadata, sending information about the unknown format to a source of said received metadata and prompting said source to use a different format for said metadata of said content item.

2. The method according to claim 1, wherein said received format of said received metadata is an extended markup language format.

3. The method according to claim 2, wherein said processing step is adapted to use an extensible stylesheet language transformation.

4. The method according to claim 3, further comprising creating a dedicated extensible stylesheet language transformation document that describes how to automatically transform metadata of said received format into metadata of said predetermined common format.

5. The method according to claim 4, further comprising receiving a new content item, checking based on received metadata related to said new content item whether said new content item belongs to a dedicated scope of a recommendation group of said recommender engine, and using said received new content item to establish a new scope or adding said received new content item to an existing scope, if said received new content item does not belong to any dedicated scope.

6. An automatic apparatus for controlling distribution of content-related metadata from different content-related sources, said apparatus configured to:
 a) receive said metadata at an intermediate location between said content-related sources and a recommender engine, wherein said metadata is metadata of a content item to be played out on a personalized content channel;
 b) process the received metadata at said intermediate location to transform a received format of said received metadata into a predetermined common format used by said recommender engine, wherein the recommender engine is associated with the personalized content channel;
 c) forward the processed metadata to a metadata base, wherein the metadata base is connected to the recommender engine via a pre-selection filter for filtering content items; and
 d) check whether said received format of said received metadata is a known format, and if said received format is an unknown format, discard said received metadata, send information about the unknown format to a source of said received metadata and prompt said source to use a different format for said metadata of said content item.

7. A computer program product comprising a non-transitory medium for storing a computer program, which when executed on a computer device produces the steps of method claim 1.

8. The method according to claim 1, wherein said processing step is adapted to use an extensible stylesheet language transformation.

9. The method according to claim 8, further comprising creating a dedicated extensible stylesheet language transformation document that describes how to automatically transform metadata of said received format into metadata of said predetermined common format.

10. The method according to claim 1, further comprising receiving a new content item, checking based on received metadata related to said new content item whether said new content item belongs to a dedicated scope of a recommendation group of said recommender engine, and using said received new content item to establish a new scope or adding said received new content item to an existing scope, if said received new content item does not belong to any dedicated scope.

* * * * *